July 2, 1957  H. M. RAFF  2,797,927
FOLDABLE WHEEL STRUCTURES
Filed Feb. 29, 1956  2 Sheets-Sheet 1
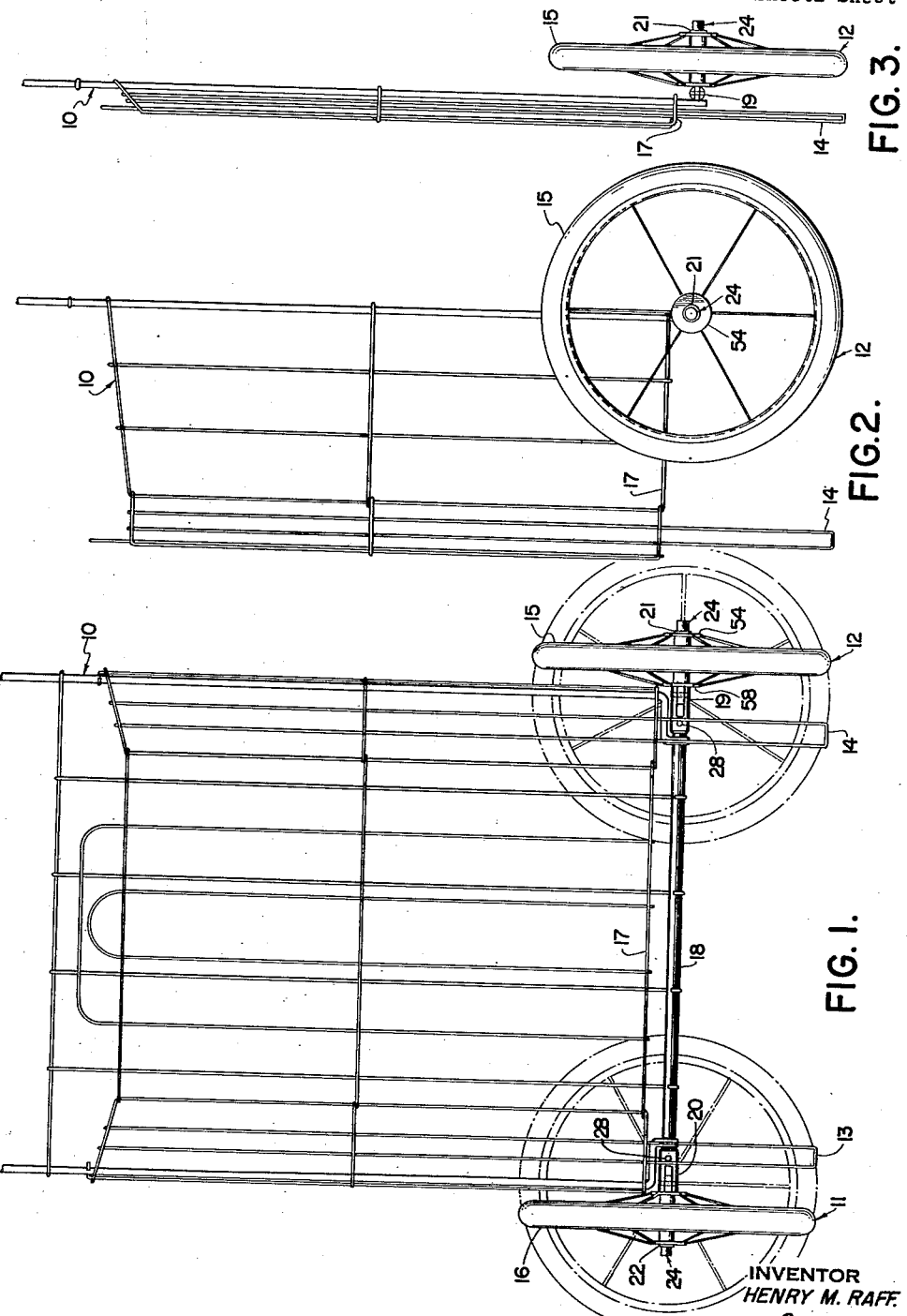
INVENTOR
HENRY M. RAFF
BY
ATTORNEY July 2, 1957

H. M. RAFF 2,797,927

FOLDABLE WHEEL STRUCTURES

Filed Feb. 29, 1956

INVENTOR
HENRY M. RAFF
BY
ATTORNEY

United States Patent Office 2,797,927
Patented July 2, 1957

2,797,927

FOLDABLE WHEEL STRUCTURES

Henry M. Raff, New York, N. Y.

Application February 29, 1956, Serial No. 568,607

6 Claims. (Cl. 280—40)

This invention relates to foldable wheel structures—more particularly to a hand-manipulable wheel mounting for manually movable carriages, in which the mounting is adapted to be moved between operative and retracted positions.

Hand-pushed carriages generally require relatively large wheels for ease of operation; but the very size of such wheels makes the carriage assembly correspondingly large and unwieldy, and of such space-consuming proportions as to be unsatisfactory for convenient storing or shipping. It is primarily within the contemplation of this invention to provide a wheel structure of the desired relatively large proportions, and yet which will be adapted for a manual folding operation to bring the wheel into collapsed or retracted position against the body of the carriage, thereby rendering the entire device of sufficiently compact proportions as to enable it to be conveniently handled, stored or shipped in assembled condition. It is my objective to provide a retractable structure of this category adapted for use with various types of hand-operated carriage devices, such as shopping carts, golf-club toters, baby carriages, strollers, wheeled toys and other similar wheeled devices.

It is also an object of my invention to enable the foldable wheel structure to be maintained firmly and rigidly in both its operative and retracted positions, as well as to be manually manipulable in and out of such positions by a simple effort requiring no special mechanical skill.

A further object of my invention is to enable the device to be incorporated as an integral portion of carriage devices, or to be installed into conventional carriage structures with a minimum of effort and expense.

Another object of my invention is to provide a relatively simple and inexpensive structure with the aforementioned features. And in this aspect of my invention it is a further object to provide a structure comprising a few readily fabricated components, having no threaded or screw portions therein, and which can be readily and quickly assembled in place.

Other objects, features and advantages will appear from the drawings and the description hereinafter given.

Referring to the drawings,

Figure 1 is a front elevation of a collapsible shopping cart incorporating a wheel structure according to one form of my invention, the cart being shown in its open or uncollapsed condition, and the wheels being shown in their operative position, the dot-dash lines indicating the position of the wheels when the structure is in its inoperative or folded condition.

Figure 2 is a side view of Figure 1.

Figure 3 is a side view of the structure of Figure 1, showing the carriage in its collapsed condition and a wheel in its folded position.

Figure 4:
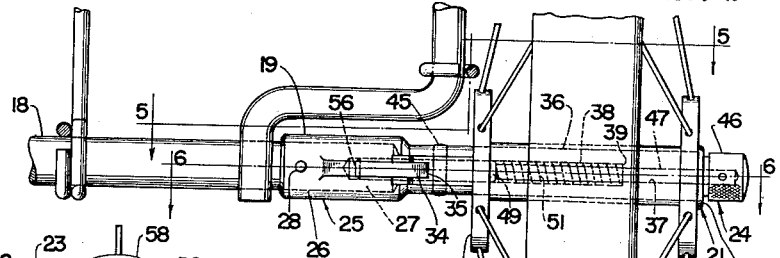
Figure 4 is an enlarged fragmentary view of the lower right-hand corner of Figure 1, showing the wheel structure in its operative position.

In the particular embodiment of my invention illustrated, the shopping cart comprises the wire-cage body portion 10 to which are secured, in a manner to be hereinafter described, the two foldable wheel-structure components generally referred to by the reference numerals 11 and 12—both being identical in construction. Said body portion 10 is of conventional collapsible structure, the details of which are well known to those skilled in the art, and hence will not be herein described. Suffice it to say, for the purpose of this specification, that when said body portion is operatively collapsed, it will assume a flattened configuration substantially like that shown in Fig. 3. In both the operative position shown in Figs. 1 and 2, and the inoperative or collapsed position shown in Fig. 3, the cart—to be hereinafter referred to as "carriage"—is supported in upright position by the two legs 13 and 14, as well as the wheels 15 and 16. Since, as aforesaid, the wheel structures 11 and 12 are similar, the description hereinafter given with respect to structure 12 is to be regarded as also applying to that of structure 11.

Disposed below the base 17 of body portion 10 of the carriage is the stationary axle 18, the brackets 19 and 20, in the form illustrated, serving as supports for said axle. Said axle 18 has connected thereto, at its opposite ends (in a manner to be hereinafter described), the axle extensions 21 and 22, the respective wheels 15 and 16 being rotatably mounted thereover.

Figure 7:
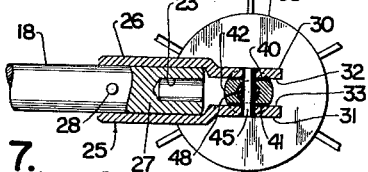
Figure 7 is a fragmentary section of Figure 5 taken substantially along line 7—7.
Figure 8:
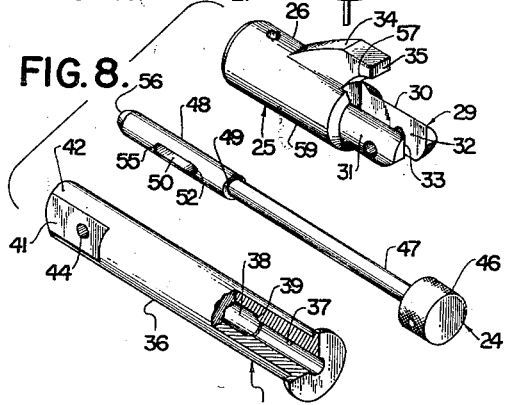
Figure 8 is a disassembled perspective view of the three main components constituting the foldable mounting for the wheel.

In the preferred embodiment illustrated, each end of axle 18 has an axial recess 23 (Figs. 6 and 7), each being adapted to receive a locking pin operatively associated with one of said wheels, so as to assure the wheels being maintained firmly in their operative positions, as will more clearly hereinafter appear. Said pins, identified by the reference numeral 24, are each slidably positioned within the corresponding axle extension, such as extension 21, the latter being pivotally connected to the stationary pivot support 25 attached to the axle 18. In the specific construction illustrated, said support is in the form of a sleeve member comprising a hollow cylindrical portion 26 mounted over the corresponding end portion 27 of axle 18, a diametrical pin 28 extending through said portion 26 and axle 18 to hold member 25 in place. Extending outwardly from said cylindrical portion 26 of member 25 is the bifurcated pivot support portion 29 comprising the two spaced parallel longitudinal legs 30 and 31, said legs having opposing flat faces 32 and 33. Extending outwardly from said cylindrical portion 26 is the lug 34 having an outer terminal portion 35 serving as a stop member, in a manner to be hereinafter set forth.

The said axle extension 21 is of generally cylindrical configuration with an outer bearing surface 36 upon which the corresponding wheel is rotatably mounted. Extending longitudinally through the entire body of said extension 21 is an axial passageway comprising the two sections 37 and 38, the latter being of greater diameter than the former and being disposed inwardly in relation thereto, the annular shoulder 39 separating both the said passageway sections. The inner end of said extension 21 has two opposite flat surfaces 40 and 41, these being spaced apart a distance substantially corresponding to the distance between said faces 32 and 33 of the said legs 30 and 31, whereby the inner end portion 42 of axle extension 21 will fit between said legs 30 and 31, as clearly indicated in Fig. 7. The transverse diametrical hole 44 is drilled through faces 40 and 41 of said terminal portion 42, to accommodate the pivot pin 45, so that the axle extension 21 can be pivotally moved about the axis of pin 45 between the operative limiting position of the wheel shown in Figs. 4 and 6, and the retracted limiting position shown in Figs. 5 and 7.

The locking pin 24 comprises the outer knob portion 46, an intermediate elongated cylindrical portion 47 and an inner somewhat enlarged cylindrical portion 48 containing the annular shoulder 49 at the juncture of said portions 47 and 48. Extending transversely through said enlarged portion 48 is the slotted portion 50. Said locking pin 24 is so proportioned that the enlarged portion 48 thereof will be accommodated by the inner passageway 38 of axle extension 21 and by the said axial recess 23 at the end of axle 18—the said intermediate portion 47 being proportioned to be accommodated by said outer passageway 37. The said hole 44 in axle extension 21 is in registry with said slotted portion 50, said pivot pin 45 extending through said slotted portion.

When said locking pin 24 is operatively disposed within said axle extension 21, it is movable longitudinally, by an operative manipulative effort applied to said knob 46, between respective inner and outer locking positions, as will hereinafter appear. Disposed within passageway 38 and surrounding said intermediate portion 47 of the locking pin 24 is the helical spring 51, the opposite ends thereof being in abutting engagement with the respective annular shoulders 39 and 49 of axle extension 21 and pin 24, respectively.

Figure 5:
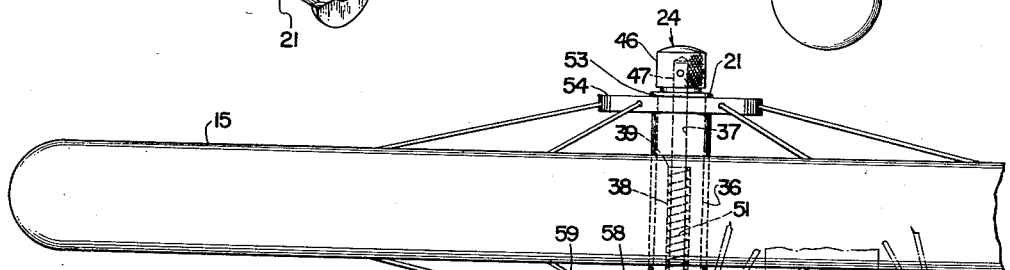
Figure 5 is a section of Figure 4 taken substantially along line 5—5, showing the wheel structure in its retracted position, the dot-dash lines indicating a wheel in its operative position.
Figure 6:
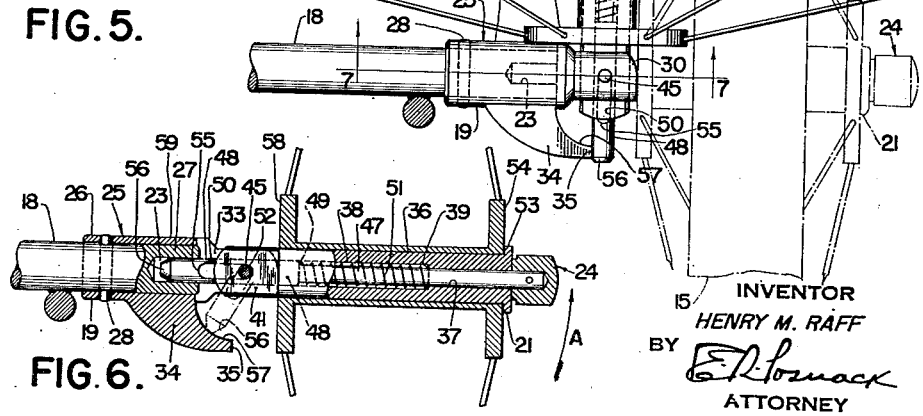
Figure 6 is a fragmentary section of Figure 4 taken along line 6—6—the dot-dash lines showing the position of the locking pin while the wheel is being moved from its operative to its retracted position.

As illustrated in Figs. 4 and 6, the terminal of this enlarged portion 48 of the pin 24 is disposed within the axial recess 23 of the axle 18 when the wheel 15 is in its operative position. The pivot pin 45 is now disposed against the outer end 52 of slot 50, said latter end limiting the inward operative movement of said locking pin to its locking position. In this position the wheel 15, rotatably mounted upon the cylindrical surface 36 of the axle extension, is held rigidly locked against displacement, since the relatively long pin 24 extends through and inwardly beyond the entire length of axle extension 21, the enlarged portion 48 being in interlocking engagement with the recessed portion 23 of stationary axle 18. The spring 51 exerts yieldable pressure upon annular shoulder 49, thereby urging the pin 24 into its said locking position. In this position the said knob 46 of the pin 24 is disposed against the outer flange 53 of the axle extension; and said flange in turn is disposed against the hub disk 54 of the wheel, to retain the wheel on said axle extension.

When it is desired to fold the wheel structure back into its retracted position, the pin is grasped by said knob 46 and operatively pulled outwardly against the action of spring 51, thereby moving the enlarged portion 48 out of the recess 23 of axle 18. This outward movement is limited by the inner end 55 of slotted portion 50; and at this extreme outer position of pin 24, the inner terminal 56 of the pin will be completely clear of the axle 18. Then a turning effort is applied to the axle extension 21 in the direction of arrow A (Fig. 6), whereby the entire mounting will rotate about pin 45 as an axis. Due to the action of spring 51, the terminal 56 of the locking pin will engage the arcuate guiding surface 57 of the lug 34, said arcuate surface extending over and being in facing relation to the space between the said legs 30 and 31 of the member 25. As this turning movement continues the terminal 56 will finally become clear of said surface 57 and snap outwardly to the position shown in Fig. 5. In this position—which is the retracted or folded position of the structure—the enlarged portion 48 of the locking pin is in abutment with the stop terminal 35 of lug 34, and the hub disk 58 is in abutment with the outer lateral surface 59 of the support member 25. The wheel is now held firmly locked against movement, whereby the entire structure can rest upon the wheels in their retracted position without danger of collapse.

It is thus apparent that the structure above described provides a firm mounting for relatively large wheels on carriages of the aforementioned category, when the wheels are in both their operative and retracted positions. And it is also evident that the operation of manipulating the wheel structure can be readily accomplished by a simple manual operation.

The structure illustrated shows the collapsible mounting applied as an integral portion of a carriage. It is evident, however, that this device could readily be incorporated into a conventional structure having a stationary single-piece axle supporting the two wheels. All that need be done is to cut off the opposite terminal portions of the axle and drill holes therein corresponding to the axial recess 23 and hole 28. Thereafter the sleeve member 25 and associated parts can be mounted in place in the manner above described.

It will further be observed that the three main components 21, 24 and 25 are simple, easily fabricated parts, having no threaded or screw portions therein. Component 25 can either be cast or forged; and components 21 and 24 can be fabricated on conventional screw machines. Hence the entire device can be produced on a mass-production basis to provide an economical structure, which need not add materially to the cost of conventional structures.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

I claim:

1. In a foldable wheel construction for a wheeled carriage, an axle secured to the carriage, a sleeve member mounted over and secured to a terminal portion of said axle and having an outwardly extending pivot support, an axle extension pivotally attached to said support and pivotally movable between two limiting positions, one being an operative position in longitudinal alignment with said axle, and the other being a retracted position substantially at right angles with said axle, said extension having a longitudinal passageway extending therethrough and an outer cylindrical bearing surface for rotatably receiving thereover a wheel of said carriage, a locking pin extending through said passageway and slidably movable between an inner locking position and an outer releasing position, interlocking means associated with said axle and proportioned for interlocking engagement with the inner terminal portion of said pin, said pin being proportioned for engagement with said interlocking means when the pin is in its said locking position, whereby said extension is held against pivotal movement, said pin being proportioned to be out of engagement with said interlocking means and with said inner terminal portion of the pin extending out of said extension in an exposed position when the pin is in its said releasing position, whereby said extension is free for operative pivotal rotation, and a lug on said sleeve member and extending outwardly therefrom, said lug having a terminal stop portion in spaced relation to said pivot support and positioned for engagement with said inner terminal portion of the pin when said terminal portion is in its said exposed position and said axle extension is in its said retracted position.

2. In a foldable wheel construction for a wheeled carriage, the combination according to claim 1, spring means urging said pin toward its said locking position, said lug having an arcuate guiding surface in facing relation to said pivot support and positioned to slidably receive thereagainst said inner terminal portion of the pin when said axle extension is operatively intermediate its said two limiting positions.

3. In a foldable wheel construction for a wheeled carriage, the combination according to claim 1, spring means urging said pin toward its said locking position, and a wheel rotatably mounted on said axle extension, said wheel having a hub disk in engagement with said sleeve member when said axle extension is in its said retracted position, whereby the wheel is held against movement out of said position.

4. In a foldable wheel construction for a wheeled carriage, the combination according to claim 1, spring means urging said pin toward its said locking position, and a wheel rotatably mounted on said axle extension, said axle extension having a flange on its outer extremity, said wheel having a hub disk in engagement with said flange.

5. In a foldable wheel construction for a wheeled carriage, the combination according to claim 1, spring means urging said pin toward its said locking position, and a wheel rotatably mounted on said axle extension, said locking pin having a knob at its outer extremity and proportioned for engagement with the outer terminal of said axle extension when said pin is in its said locking position.

6. In a foldable wheel construction for a wheeled carriage, an axle secured to the carriage, a stationary pivot support attached to a terminal portion of said axle, an axle extension pivotally attached to said support and pivotally movable between two limiting positions, one being an operative position in longitudinal alignment with said axle, and the other being a retracted position angularly disposed with reference to said axle, said extension having a longitudinal passageway extending therethrough and an outer cylindrical bearing surface for rotatably receiving thereover a wheel of said carriage, a locking pin extending through said passageway and slidably movable between an inner locking position and an outer releasing position, the end of said axle adjacent said extension having an axial recessed portion therein proportioned to receive the inner terminal portion of said pin, said pin being proportioned for engagement with said recessed portion when the pin is in its said locking position, whereby said extension is held against pivotal movement, said pin being proportioned to be out of engagement with said recessed portion when the pin is in its said releasing position, whereby said extension is free for operative pivotal rotation, and a knob at the outer end of said pin, said locking pin having at the inner portion thereof an elongated slotted portion, said pivot support having a transverse pivot pin extending therethrough and through said slotted portion of said locking pin, said axle extension being pivotally mounted over said pivot pin.

References Cited in the file of this patent

UNITED STATES PATENTS

| 2,417,727 | Batlle | Mar. 18, 1947 |
| 2,468,914 | Banaszak | May 3, 1949 |
| 2,699,951 | Gans | Jan. 18, 1955 |

FOREIGN PATENTS

| 886,248 | France | Oct. 8, 1943 |